United States Patent
Buisman et al.

(12)

(10) Patent No.: US 6,656,249 B1
(45) Date of Patent: Dec. 2, 2003

(54) METHOD FOR DESULPHURIZATION OF GASES

(75) Inventors: Cees Jan Nico Buisman, Harich (NL); Albert Joseph Hendrik Janssen, Sneek (NL); Robert Jan Van Bodegraven, Harich (NL)

(73) Assignee: Paques Bio Systems B.V., Balk (NL)

( * ) Notice: Subject to any disclaimer, the term of this patent is extended or adjusted under 35 U.S.C. 154(b) by 0 days.

(21) Appl. No.: 09/936,204

(22) PCT Filed: Mar. 8, 2000

(86) PCT No.: PCT/NL00/00155

§ 371 (c)(1),
(2), (4) Date: Sep. 10, 2001

(87) PCT Pub. No.: WO00/53290

PCT Pub. Date: Sep. 14, 2000

(30) Foreign Application Priority Data

Mar. 8, 1999 (NL) .............................................. 1011490

(51) Int. Cl.$^7$ .............................................. B01D 53/14
(52) U.S. Cl. .............................. 95/195; 95/205; 95/235; 96/234; 210/622
(58) Field of Search ................................. 210/622, 620; 95/156, 195, 205, 202, 235; 96/234

(56) References Cited

U.S. PATENT DOCUMENTS

| 5,474,682 A | * 12/1995 | Buisman |
| 5,747,331 A | * 5/1998 | Hartikainen et al. |
| 5,958,238 A | * 9/1999 | Langerwerf |
| 6,156,205 A | * 12/2000 | Buisman et al. |

FOREIGN PATENT DOCUMENTS

| WO | WO 97/43033 | 11/1997 |
| WO | WO 98/57731 | 12/1998 |

* cited by examiner

*Primary Examiner*—Duane S. Smith
(74) *Attorney, Agent, or Firm*—Young & Thompson

(57) ABSTRACT

A method of removing hydrogen sulphide from a gas stream wherein the hydrogen sulphide is scrubbed from the gas phase by an aqueous solution, the hydrogen sulphide in the aqueous solution is biologically oxidized in a bioreactor to produce elemental sulphur, and the elemental sulphur is separated from the aqueous solution, characterized in that the gas stream to be treated is cooled to such a degree that at least sufficient water vapour condenses from the gas stream to compensate for the discharge stream for the purpose of removing salts. This means that no water need be supplied to the bioreactor. This method is suitable, in particular, for gas streams which contain hydrogen sulphide, the hydrogen sulphide having been obtained by catalytic conversion of sulphur compounds.

12 Claims, 1 Drawing Sheet

METHOD FOR DESULPHURIZATION OF GASES

FIELD OF THE INVENTION

The present invention relates to a method of removing sulphur compounds from a gas stream. In this method, the sulphur compounds are first converted into hydrogen suilphide, and the hydrogen sulphide is then, in an aqueous solution, converted into elemental sulphur by biological oxidation.

BACKGROUND OF THE INVENTION

As far as the oil and gas(-processing) industry is concerned, sulphur compounds are among the most important pollutants which can occur in off-gases. It is a pollutant which occurs at high concentrations, and legislation relating to these compounds is very strict.

Consequently, many processes are known for removing sulphur compounds from gasses. One of the most important processes comprises the catalytic conversion of the sulphur compounds to elemental sulphur. A major advantage of this process is that the elemental sulphur is a product of intrinsic economic value.

The most important process for converting sulphur compounds, especially hydrogen sulphide, into elemental sulphur is the so-called Claus process. Using this process, a total sulphur removal of about 95% can be achieved. The residual quantity of sulphur is contained in the so-called "Claus off-gas" (sometimes referred to as "Claus tail gas") in the form of sulphur compounds such as COS, $CS_2$, $SO_2$ and $SO_3$, but also small amounts of gaseous elemental sulphur ($S_x$) and mercaptans (RSH).

In other processes too, sulphur-containing gas streams can be formed, such as synthesis gas or fuel gas, which still contain the abovementioned undesirable sulphur compounds. These sulphur compounds are often converted into hydrogen sulphide by means of catalytic hydrogenation or catalytic hydrolysis.

An example of the catalytic hydrogenation of these compounds to produce hydrogen sulphide is the so-called SCOT process (Shell Claus Off-gas Treatment). This process converts the sulphur compounds present in the off-gas of the Claus process. Usually, the hydrogen sulphide thus formed, having been selectively removed by means of an amine-containing solution, is recycled to the Claus reactor to increase the efficiency of the latter.

Even the off-gas of said SCOT process may still contain traces of sulphur components, generally traces of COS and $CS_2$. To prevent emission of these compounds, this process will generally comprise an afterburning step, in which these compounds are converted into $SO_2$.

Alternatively, the undesirable sulphur compounds can be converted to hydrogen sulphide by catalytic hydrolysis. Such a process is used, in particular, in gas streams which contain carbonyl sulphide (COS). Characteristic gas phase hydrolysis catalysts are based on copper sulphide, chromium oxide, chromium oxide/aluminium oxide, and platinum.

Another example of a process in which sulphur compounds present in the Claus off-gas are converted to hydrogen sulphide is the so-called Beavon process. This process is used to remove sulphur compounds from off-gas of the Claus process by means of hydrolysis and hydrogenation over a cobalt molybdate catalyst, which results in the conversion of carbonyl sulphide, carbon disulphide and other sulphur compounds into hydrogen sulphide.

OBJECT OF THE INVENTION

It is an object of the present invention to provide a method of converting hydrogen sulphide into elemental sulphur, said method making use of aerobic bacteria. Consequently, the resultant $H_2S$ from the catalytic reduction step will not be recycled to the Claus reactor. This application is of interest, in particular, if a Claus installation of this type is unavailable, as is the case, for example, with so-called stand-alone SCOT units.

Another object of the present invention is to carry out this conversion in such a way as to thereby achieve high efficiency.

SUMMARY OF THE INVENTION

A method of removing hydrogen sulphide from a gas stream has now been found wherein the hydrogen sulphide is scrubbed from the gas phase by means of an aqueous solution, the hydrogen sulphide in the aqueous solution is biologically oxidized in a bioreactor to produce elemental sulphur, and the elemental sulphur is separated from the aqueous solution, characterized in that the gas stream to be treated is cooled to such a degree that at least sufficient water vapour condenses from said gas stream to compensate for the discharge stream for the purpose of removing salts. This means that no water need be supplied to the bioreactor, and it may even be possible to produce good-quality water.

The method according to the present invention further provides the following advantages:

Using this method, it is possible for elemental sulphur to be obtained with a high yield from gas streams which contain hydrogen sulphide.

Any HCN present in the gas stream reacts with elemental sulphur to form thiocyanate ($SCN^-$) which is biodegraded.

Even traces of other sulphur compounds still present in the gas stream are converted.

The process has low energy consumption.

No expensive chemicals are required.

The process can be operated in a simple manner.

BRIEF DESCRIPTION OF THE DRAWINGS

To clarify the present method, the following figures are appended.

DETAILED DESCRIPTION OF THE INVENTION

Figure 1:
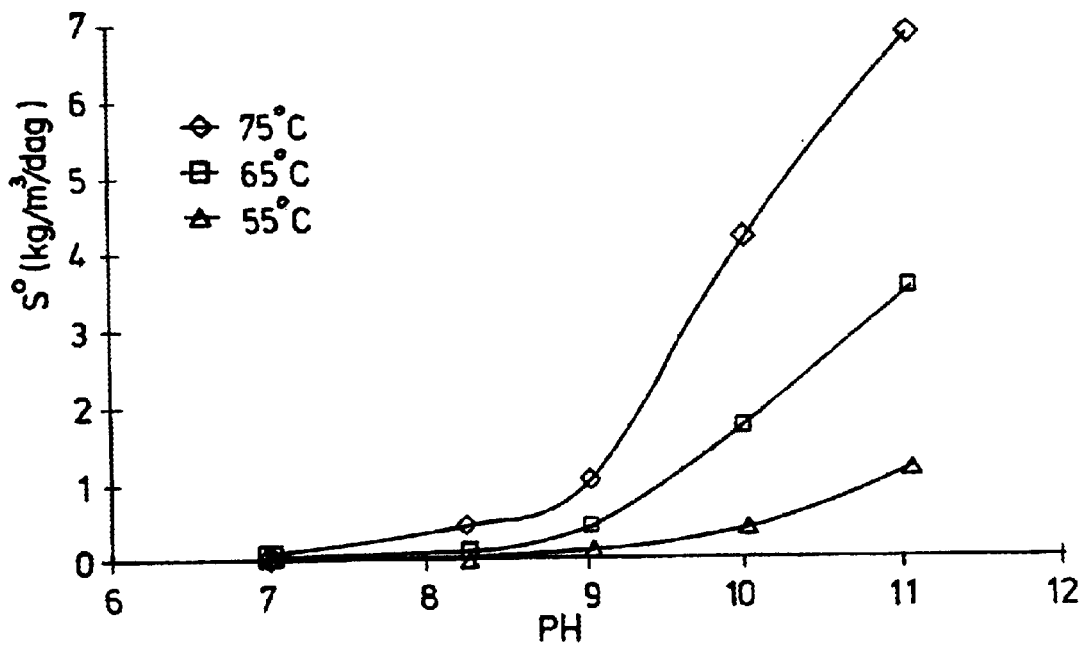
FIG. 1, which depicts the decay rate of the biologically produced sulphur as a function of the pH and temperature.

It is preferable for the hydrogen sulphide to have been obtained by catalytic conversion of sulphur compounds.

The sulphur compounds are converted, preferably by catalytic hydrogenation, to hydrogen sulphide. This conversion is suitable, in particular, when the sulphur compounds comprise sulphur dioxide ($SO_2$), sulphur trioxide ($SO_3$), carbonyl sulphide (COS), carbon disulphide ($CS_2$) and sulphur vapour ($S_x$). Preferably, the sulphur compounds are converted to hydrogen sulphide by means of the hydrogenation step in the above-described SCOT process.

Alternatively, the sulphur compounds can be converted to hydrogen sulphide by catalytic hydrolysis. Catalytic hydrolysis is suitable, in particular, if the gas stream comprises carbonyl sulphide (COS) and possibly carbon disulphide ($CS_2$) and mercaptans (RSH).

Biological oxidation of hydrogen sulphide to elemental sulphur is known. Such methods are described, for example, in WO 96/30110 and WO 92/10270.

A Claus unit designed for 100 T/D of sulphur generally produces about 13,000 $M^3$ (s.t.p.) of off-gas. After conversion in the catalytic reduction reactor the off-gas contains 2–8 T/D of sulphur, depending on the efficiency of the upstream Claus unit. About a third of the volume of the gas is water. The temperature of the gas is 200–340° C., depending on the catalyst and the conversion requirements. A typical value of the dew point of the gas is between 65 and 75° C. This gas must be cooled to a temperature at which it will no longer adversely affect the biomass bioreactor. This cooling is preferably carried out in a quench column, the gas stream being brought into contact with a circulating water stream which is cooled by an external cooler. Upstream of the quench column there may be a heat recovery boiler, if good use can be made of the steam. The temperature of the quench water system is between 25 and 65° C. and is preferably low enough for a sufficient amount of water to be condensed to eliminate the need for make-up water.

The quench column serves to cool the gas, thus preventing excessive uptake of undesired components such as sulphur dioxide and ammonia. These components can be present in the gas owing to variations in the upstream equipment and can have a negative effect on the biosystem. The quench column can also be used for the recovery of water. The water produced in the quench column, after a simple step involving steam stripping, is of very good quality and can be used as feed water for a boiler or can be stored as clean water in a reservoir.

Part of the $H_2S$ absorbed in the biosystem is oxidized to sulphate. This is formed as a result of the undesirable oxidation to the highest state of sulphur according to:

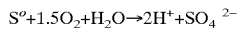

The sulphate production is from about 3 to 10% of the total sulphide load. To prevent acidification of the medium in the reactor, the sulphate produced needs to be neutralized, for example with sodium hydroxide or sodium carbonate. The sodium sulphate formed needs to be discharged from the system. The essence of the patent application is based on such cooling of the sour gas to below its dew point that enough condensate water is formed to compensate for the discharge stream.

The make-up water required to compensate for this discharge can be supplied from the quench column. It is also possible for the temperature of the quench column to be set to a higher value than that of the bioreactor, so that enough water will condense in the scrubbing column.

As described above, the hydrogen sulphide is scrubbed from the gas phase by means of an aqueous solution. This step can be carried out in a gas scrubber in which intensive contact is effected between the gas stream and the scrub liquor.

If required, the scrub liquor can be buffered to a pH of between 6.0 and 10.0.

The buffering compounds must be tolerated by the bacteria present in the oxidation reactor. Preferred buffering compounds are carbonates, bicarbonates, phosphates and mixtures thereof, in particular sodium carbonate and/or sodium bicarbonate. The concentration of the buffering compounds is generally set to a value of between 20 and 2000 meq/l. If sodium carbonate is employed as the buffering compound, its concentration is preferably set to from about 15 to 25 g/l. Where the present description refers to concentrations of bicarbonate and carbonate, these are expressed, respectively, as the concentration by weight of the ions $HCO_3^{31}$ and $CO_-$. The ratio of $HCO_3^-$ to $CO_3$ depends on the pH of the solution, which in turn is determined by the partial pressure of $CO_2$ and $H_2S$ of the gas stream to be treated.

The addition of buffering compounds can take place after the scrub liquor has left the gas scrubber, but also before it is passed into the gas scrubber.

It is necessary for the moist gas to be cooled so as to attain the desired temperature in the bioreactor. The desired equilibrium temperature of the suspension in the bioreactor depends on (1) the temperature at which the microorganisms are still active, and (2) the chemical stability of the sulphur formed. Laboratory studies have established that Thiobacilli are capable, up to a temperature of 70° C., of oxidizing the sulphide. At these high temperatures, however, the sulphur formed will hydrolyse to a considerable extent, in accordance with the following reaction equation:

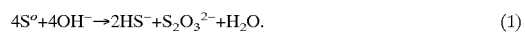

In addition, it is also possible for sulphide ($HS^-$) and sulphate ($SO_4^{2-}$) to be formed, in accordance with:

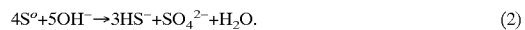

Laboratory experiments, carried out with sulphur formed biologically, produced by a THIOPAQ reactor, have shown that chiefly sulphide ($HS^-$) and thiosulphate ($S_2O_3^{2-}$) are formed, and the assumption is therefore that reaction (1) is the main one to take place.

FIG. 1 depicts the rate of decay of the biologically produced sulphur as a function of the pH and the temperature.

As the chemical stability of the sulphur produced decreases with increasing pH and temperature, the temperature of the suspension in the bioreactor must not exceed 65° C.

As bacteria which, if the scrub liquor is treated in the presence of oxygen, oxidize sulphide to elemental sulphur (here referred to as sulphur-oxidizing bacteria), the autotrophic aerobic cultures known for this purpose are potentially suitable, such as those of the genera *thiobacillus* and *thiomicrospira*.

It is advantageous for the specific conductivity of the aqueous solution in which the hydrogen sulphide is absorbed to be constant. The specific conductivity is a measure for the total amount of dissolved salts. This chiefly relates to sodium (bi)carbonate and sodium sulphate. The specific conductivity should be controlled within a range from 10 to 100 mS/cm, preferably between 40 and 70 mS/cm.

The quantity of oxygen added to the scrub liquor is controlled so as to ensure that the oxidation of the absorbed sulphide mainly gives rise to elemental sulphur. Such a method of controlled oxidation of sulphur-containing waste water is described in the Dutch patent application 8801009.

The formation of sulphur in the oxidation reactor leads to a sulphur suspension, which is drawn off. The sulphur from this suspension is separated from the aqueous solution by filtration, centrifuging, flocculation, settling, etc. After separation, the sulphur can be further processed by drying and possible purification, and be re-used. The remaining liquor can be re-used as scrub liquor.

It proves beneficial for not all the sulphur to be drawn off and the drawing off to be carried out discontinuously or in part, thereby producing a scrub liquor which still contains sulphur. The sulphur concentration in the scrub liquor is generally kept between 0.1 and 50, preferably between 1 and 50, more preferably between 5 and 50 g/l (from 1 to 5 wt %). In particular, the percentage of sulphur separation is controlled in such a way that as much scrub liquor as possible is re-used. The liquor recovered when the drawn-off sulphur is processed can, if appropriate, be added to the scrub liquor.

addition to hydrogen sulphide, the gas may also contain hydrogen cyanide gas (HCN). Especially in the event of HCN being present as a component in the gas, elemental sulphur in the scrub liquor is beneficial. The cyanide, which is toxic to most bacteria, is thereby converted into the much less toxic thiocyanate which is subseqaently broken down biologically and/or chemically. Ultimately, HCN is converted into carbon dioxide and nitrate.

The sulphide concentration, expressed as sulphur, in the scrub liquor used, having a pH of about 8.5, will usually be about 15–3000 mg/l when gases of roughly atmospheric pressure are cleaned.

The ratio of the amounts of scrub liquor to gas is determined, on the one hand, by the absorption capacity of the scrub liquor with respect to $H_2S$ and, on the other hand, by hydrodynamic characteristics of the gas scrubber.

The gas scrubbers to be used according to the invention can be of a customary type, as long as an effective contact is achieved, in the gas scrubbers, between the gas stream and the scrub liquor.

Preferably, use is made, for the method according to the invention, especially for the aerobic reactor(s), of reactors of the vertical circulation type as described, for example, in the International patent application 94/29227, wherein the gas to be used (in the aerobic reactor this is usually air) is able to provide the vertical circulation.

Figure 2:
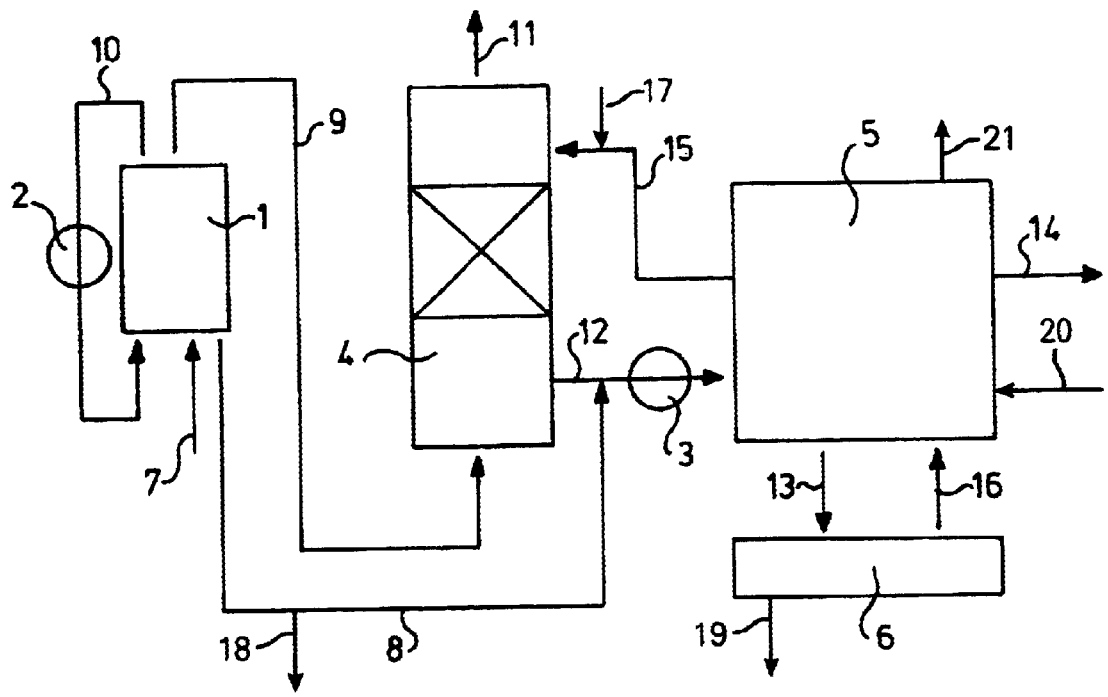
FIG. 2 which depicts an embodiment of the present invention.

FIG. 2 depicts a possible embodiment of the method according to the present invention, wherein the hot gas is cooled in a quench 1 combined with a cooler 2, a second cooler 3 being positioned, if required, between the gas scrubber (=absorber) 4 and the THIOPAQ bioreactor 5. The water which condenses in the quench 1 is passed, in its entirety or in part, to the bioreactor 5. Any excess water can be discharged via 18 and, after stripping of $H_2S$, be used elsewhere on site as process water.

The gas stream 7 to be treated is cooled in quench 1 to below the dewpoint (65–75° C.) by cooling water which is recirculated via the quench being cooled via 10 by means of cooler 2. Via 8, the condensate is passed to the bioreactor 5 to serve as make-up water so as to eliminate the sulphates formed. Any excess water is discharged via 18. Via 9, the cooled gas is directed to the gas scrubber 4 where the gas is scrubbed with stream 15 which, via 17, is admixed with a small amount of sodium hydroxide or sodium carbonate. In the gas scrubber, the $H_2S$ is efficiently scavenged. Emerging from the gas scrubber is a gas stream 11 and the $H_2S$-containing scrub water which is passed from the gas scrubber via 12, together with the condensate, to the bioreactor 5. If necessary, this stream is further cooled with the aid of cooler 3.

In the bioreactor, the $H_2S$ is oxidized to elemental sulphur and, to a small extent, to sulphate. For the purpose of the oxidation, air is introduced into the bioreactor via 20. The exhaust air is discharged via 21. The sulphate formed is eliminated via 14, together with the condensate required therefore. A substream from the bioreactor is directed, via 13, to a sulphur recovery unit 6 where the sulphur is separated via 19. From the sulphur recovery unit 6, part of the recovered sulphur is recycled to the bioreactor 5 via line 16.

According to this embodiment, the quench 1 and the gas scrubber 4 are positioned above one another in the same column, the water circulation remaining separate within the two sections.

The water content in the hot gas on average is about 33 mol%, which is amply sufficient. The amount of water which condenses can be controlled by setting the temperature in the coolers. The cooler the temperature set, the more water will condense.

EXAMPLES

In the table below, two gas streams are used as an example. These gas streams have been catalytically treated before $H_2S$ is removed and converted biologically into elemental sulphur.

TABLE I

Gas streams as an example of treatment in a catalytic/biological desulphurization process

| Type of gas | 1<br>Claus off-gas | 2<br>Syngas |
|---|---|---|
| Composition<br>(dry-gas analysis)<br>(in vol %) | | |
| $H_2S$ | 0.45 | 1.9 |
| $SO_2$ | 0.22 | — |
| COS | 75 ppm | 0.1 |
| $CS_2$ | 60 ppm | 300 ppm |
| $CH_3SH$ | — | 50 ppm |
| $S_x$ | 600 ppm | — |
| CO | 0.22 | 29 |
| $CO_2$ | 3 | 26 |
| $H_2$ | 2.2 | 40 |
| $N_2$ | 94 | 0.9 |
| $CH_4$ | — | 2 |

Example 1

Claus Off-gas

After catalytic conversion, Claus off-gas (20,000 m³ (s.t.p.)/h) has a temperature of 200° C. About 4 tonnes of sulphur are removed as $H_2S$ each day. The hot gas contains 33 vol% of water vapour. In the Thiopaq reactor, 25 kg of $SO_4$/h is formed, based on 5% oxidation to the highest state. With a standard sulphate concentration in the bioreactor of 18 kg of $SO_4$/m³, the discharge stream will be 1.4 m³/h. Cooling the gas to 63° C. will produce the same amount of condensate water. Cooling is effected as follows: by means of a quench, the gas is cooled to its dew point of about 70° C. The biological system is operated at 50° C., thus causing the temperature of the gas in the absorber to drop to 63° C. The scrub water used will warm up in the process, which means that a heat exchanger will be required.

Example 2

Syngas

After catalytic conversion, syngas has a temperature of 160° C. and a flow rate of 6000 m³ (s.t.p.)/h. About 4 tonnes of S are removed as $H_2S$ each day. The gas contains 30 vol% of water vapour.

Maintaining the conductivity at the desired level requires a discharge stream of 1.4 m³/h. Because the amount of gas is much lower than in the previous example, cooling of the gas takes place directly in the absorber. Cooling the gas to 56° C. causes condensation of enough water vapour to obtain the desired discharge stream. Cooling is achieved by the biological system being operated at 48° C. The heated scrub water is cooled by means of a heat exchanger.

Example 3

An amount of gas (31,574 m³ (s.t.p.)/h) from a hydrogenation reactor has the following composition:

1.24 vol% of $H_2S$
2.02 vol% of $H_2$
12.64 vol% of $CO_2$
56.65 vol% of $N_2$
0.67 vol% of Ar
26.80 vol% of $H_2O$ The temperature is 317° C. and the pressure is 1.10 bar (abs).

If this gas is cooled to 32° C., the water content drops to 4.55 vol %. This means that 5.89 m³/h of water will condense. If 3.5% of the captured $H_2S$ oxidizes to a sulphate, 57 kg/h of sulphate are formed. For a sulphate content of 25 kg/M³, the discharge stream will be 2.3 m³/h. The net production of water which can be used for other purposes is 3.59 m³/h.

What is claimed is:

1. A method of removing hydrogen sulfide from a gas stream, comprising scrubbing a gas stream containing hydrogen sulfide with an aqueous solution, biologically oxidizing the hydrogen sulfide in the aqueous solution in a bioreactor to produce elemental sulfur, separating the elemental sulfur thus produced from the aqueous solution, and cooling the gas stream to such a degree that at least sufficient water vapor condenses from said gas stream to add water to a discharge stream from said bioreactor for the purpose of removing salts.

2. A method as claimed in claim 1, comprising performing said cooling step of said gas stream in a quench column, and passing at least a portion of the condensate water obtained in the quench column to the bioreactor.

3. A method as claimed in claim 1, and performing said cooling step of said gas stream in a quench column to a temperature higher than the temperature of the bioreactor.

4. A method as claimed in claim 1, and carrying out said scrubbing under such process conditions that an emerging scrub liquor in which hydrogen sulfite has been absorbed is suitable for biological oxidation.

5. A method according to claim 1, and keeping the conductivity of the aqueous solution constant by said condensation of water vapor.

6. A method as claimed in claim 1, and obtaining said hydrogen sulfide at least in part by catalytic conversion of sulfur compounds.

7. A method as claimed in claim 6, and performing said catalytic conversion of sulfur compounds by catalytic hydrogenation.

8. A method as claimed in claim 7, wherein said sulfur compounds to be removed are selected from the group consisting of sulfur dioxide, sulfur trioxide, carbonyl sulfide, carbon disulfide, mercaptans and sulfur vapor.

9. A method as claimed in claim 6, wherein said conversion of sulfur compounds is performed by catalytic hydrolysis.

10. A method according to claim 9, wherein said sulfur compounds to be removed are selected from the group consisting of carbonyl sulfide, carbon disulfide and mercaptans.

11. A method according to claim 1, and recirculating to the bioreactor aqueous solution from which elemental sulfur has been separated.

12. A method according to claim 1, and keeping the temperature of the bioreactor to a value that does not exceed 65° C.

* * * * *